United States Patent [19]

Beers

[11] 4,323,489
[45] Apr. 6, 1982

[54] EXTREME LOW MODULUS RTV COMPOSITIONS

[75] Inventor: Melvin D. Beers, Schenectady, N.Y.

[73] Assignee: General Electric Company, Waterford, N.Y.

[21] Appl. No.: 135,959

[22] Filed: Mar. 31, 1980

[51] Int. Cl.$^3$ .............................................. C08L 91/00
[52] U.S. Cl. ............................ 524/788; 427/387; 427/393.6; 428/447; 428/703; 528/18; 528/33; 528/34; 528/37; 528/901; 524/864
[58] Field of Search ............... 528/18, 33, 34, 37, 528/901; 260/18 S, 37 SB; 427/387, 393.6; 428/447, 703

[56] References Cited

U.S. PATENT DOCUMENTS

| | | | |
|---|---|---|---|
| 2,938,009 | 5/1960 | Lucas | 260/37 |
| 3,004,859 | 10/1961 | Lichtenwalker | 106/308 |
| 3,296,199 | 1/1967 | Murphy | 260/46.5 |
| 3,341,486 | 9/1967 | Murphy | 260/18 S |
| 3,417,047 | 12/1968 | Golitz et al. | 260/37 SB |
| 3,441,583 | 4/1969 | Murphy | 260/448.2 |
| 3,488,371 | 1/1970 | Klebe | 260/448.2 |
| 3,517,001 | 6/1970 | Berger | 260/248 |
| 3,528,941 | 9/1970 | Murphy | 260/37 SB |
| 3,635,743 | 1/1972 | Smith | 106/288 Q |
| 3,776,933 | 12/1973 | Toporcer | 260/448.2 E |
| 3,962,160 | 6/1976 | Beers et al. | 260/18 S |
| 3,996,184 | 12/1976 | Klosowski | 260/32.6 R |

*Primary Examiner*—Melvyn I. Marquis
*Attorney, Agent, or Firm*—E. Philip Koltos

[57] ABSTRACT

A room temperature vulcanizable silicone rubber composition with very low modulus comprising a silanol end-stopped diorganopolysiloxane, a difunctional acetamide coupler and as the cross-linker, a minor amount of compound selected from ketoxime functional and aminoxy functional silanes and mixtures thereof.

43 Claims, No Drawings

EXTREME LOW MODULUS RTV COMPOSITIONS

BACKGROUND OF THE INVENTION

The present invention relates to room temperature vulcanizable silicone rubber compositions and more particularly the present invention relates to room temperature vulcanizable silicone rubber compositions with a very low modulus.

One component room temperature vulcanizable silicone rubber compositions (hereinafter referred to as RTV compositions) are well known. In particular the most common of such compositions comprise a silanol end-stopped diorganopolysiloxane polymer as the base polymer and methyl triacetoxy silane or methyltrimethoxy silane as the cross-linking agent. To such ingredients there may be further added other ingredients such as extending and reinforcing fillers, flame retardant additives, solvent resistant additives and other additives which are wellknown in the art. The composition is prepared by taking the ingredients and mixing them in such a way as to make them substantially anhydrous by removing most of the moisture from the ingredients. The compositions are then stored as such in caulking tubes or smaller tubes and when it is desired to cure the composition, the seal on the container is broken, the RTV composition is applied in whatever form desired and exposed to atmospheric moisture. Upon exposure to atmospheric moisture the composition cross-links to the silicone elastomer with complete cure taking place in about 24 hours through a thickness of approximately ⅛ in. While acyloxy-functional silane and alkoxy functional silane cross-linking agents are the most well-known of the cross-linking agents in RTV compositions, there are other cross-linking silanes and siloxanes that may be utilized to prepare one part RTV compositions. As to ketoxime functional silane RTV compositions, note the disclosure of Beers, et al. U.S. Pat. No. 3,962,160, which is hereby incorporated by reference. Besides the one-component compositions, there are also well-known two-component compositions. One type of twocomponent RTV composition is generally comprised of silanol end-stopped diorganopolysiloxane as the base polymer which is cross-linked with aminoxy functional silane. In such compositions there is also incorporated fillers and other desirable ingredients. When it is desired to cure the composition, the aminoxy functional silicone compound is added to the silanol base polymer and other ingredients. The composition then cross-links to form a silicone elastomer. The difficulty with such two component RTV compositions is that it requires rather precise metering of the cross-linker into base silanol polymer and, of course, also requires more mixing time and application time which increases the labor cost necessary to use or apply the composition. Disclosures of such aminoxy functional RTV compositions is, for instance, to be found in disclosures of the following patents: Murphy, U.S. Pat. No. 3,528,941; Murphy, U.S. Pat. No. 3,441,583; Murphy, U.S. Pat. No. 3,926,199; Murphy, U.S. Pat. No. 3,341,486. The disclosure of all these patents are incorporated into the present case by reference. There are other aminoxy functional silicone patents which are not disclosed above which relate to other aspects of an aminoxy functional silicone compositions. The above patents are representative of such compositions.

It should be noted that there are also known amide functional RTV compositions, as for instance to be found in the disclosure of Golitz et al, U.S. Pat. No. 3,417,047 which is hereby incorporated into the present case by reference. This patent disclosed an acetamide or amide functional one-component RTV composition which is formed by mixing a base-silanol end-stopped diorgano-polysiloxane polymer with an amide functional silane or siloxane cross-linking agent where there is at least 3 amide radicals per silicon atom. Such a composition did produce a one-component RTV composition. It has one difficulty and that is it would tend to cure prematurely in the package and thus had a poor shelf life. In addition, when it was applied it would cure very rapidly even in the case where the composition was used soon after it has been packaged. See also compositions as disclosed in Klebe U.S. Pat. No. 3,488,371, which is incorporated into the present case by reference. Accordingly, as noted above while the aminoxy functional silicone compositions and the ketoxime functional compositions were suitable compositions, the difficulty with the aminoxy system was that it was a two component packaged form while the ketoxime system did not appear to give sufficient advantages over the more simple acyloxy functional system so as to warrant such system being widely used.

It should be noted that the amide one-component RTV system also had disadvantages. However, recently there has been evidenced a need for a certain type of one-component RTV system. In concrete road beds, the joint between the concrete blocks in the highway is usually sealed with a tar of some type or other. It has been noted that such tarry substances could not take the contraction and expansion of the concrete road blocks sufficiently and thus after a period of time would crack and permit water to seep underneath the concrete block road bed. The cracking of the tar joint and the allowing of water to get in beneath the concrete blocks and in the joint between the concrete blocks resulted in undesired freezing of the joint and around the joint which resulted in premature cracking of the concrete blocks on the road bed. Accordingly, it was highly desirable to find a different type of sealer for joints between concrete blocks and one that had a sufficiently low modulus such that it would expand and contract sufficiently with the contraction and expansion of the concrete blocks through various extreme temperatures. It was desirable that such joint filler compound not only have a low modulus but also have a certain amount of adhesiveness to concrete substructures with or without a primer. One component RTV compositions and two component systems were suggested for such a use. However, the existing compositions did not appear suitable. Two component RTV systems did not have a high enough modulus and also required sizable labor and specifically skilled labor to apply the compositions as stated previously. With respect to the one-component systems, such one-component systems do not have a low enough modulus or do not have sufficient adhesion to the concrete. It appears that one attempt to produce a one-component RTV system with a sufficiently low modulus cured silicone elastomer was a system disclosed in Klosowski, U.S. Pat. No. 3,996,184 which is incorporated into the present case by reference. Such a composition comprises as a basic ingredient a silanol end-stopped polysiloxane, as a coupler a difunctional amide and specifically methyl vinyl di-(N-organo acetamido) silane and as a cross-linker an aminoxy functional polysiloxane as disclosed in the foregoing Murphy patents. The function of the coupler was that the amide groups would immediately add on to the silanol end-stopped diorganopolysiloxane polymer. Then when the composition was exposed to atmospheric moisture, the minor amount of aminoxy cyclopolysiloxane would crosslink the system to form a silicone elastomer of low modulus. This composition was not desirable since it utilized a solvent. Accordingly, it was highly desirable to find a one-component RTV system with a sufficiently low modulus which would bound to concrete with a primer. Accordingly, it was highly desirable to find a one component RTV system with sufficiently low modulus and with superior adhesion to concrete and other types of masonary substrates.

It is one object of the present invention to provide for a one-component RTV system with an extremely low modulus. It is an additional object of the present invention to provide a one-component RTV system with an extremely low modulus and sufficient adhesion to masonary substrates with as a cross-linker a ketoxime functional silicone compound.

It is another object of the present invention to provide a one-component RTV system with an extremely low modulus with sufficient adhesion to masonary substrates which has as the cross-linker an aminoxy functional silicone compound. It is yet an additional object of the present invention to provide for a process for producing a one-component RTV composition with an extremely low modulus. These and other objects of the present invention are accomplished by means of the disclosures set forth herein below.

SUMMARY OF THE INVENTION

There is provided by the present invention and in accordance with the above objects, a room temperature vulcanizable silicone rubber composition with very low modulus comprising (A) 100 parts by weight of a silanol end-stopped diorganopolysiloxane polymer having a viscosity varying from 100 to 100,000 centipoise at 25° where the organo group is a monovalent hydrocarbon radical; (b) from 1 to 5 parts by weight of a coupler having the formula,

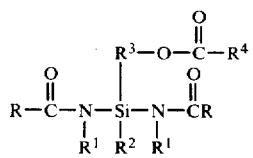

(1)

where R, $R^1$, $R^2$, $R^4$ are monovalent hydrocarbon radicals of 1 to 8 carbon atoms, $R^3$ is a divalent hydrocarbon radical of 2 to 8 carbon atoms; and (c) from 0.01 to 5.0 parts by weight of cross-linker selected from the class consisting of ketoxime functional silanes and aminoxy silane compounds and mixtures thereof. There may be incorporated fillers and various adhesive promoters into this composition. Preferably there is incorporated anywhere from 2 to 60 parts by weight of a reinforcing or semi-reinforcing filler. If such a filler is fumed silica, precipitated silica or fine calcium carbonates there also may be incorporated from 5 to 300 parts by weight of a filler where the filler is an extending filler. In between those two concentrations of fillers, there may be utilized a concentration of the reinforcing and extending types. The reason it is not desired to use a reinforcing or semi-reinforcing filler above the amounts indicated above is that it increases the modulus undesirably and also increases the uncured viscosity of the composition. Desirably sufficient amounts of filler of the reinforcing filler are utilized as desired to give the composition desired tensile strength. There may be used the various types of adhesion promoters in the composition such as silyl functional triallyisocyanurate, diallyl maleates, fumarates and succinates. Irrespective of whether the silyl maleates or fumarates are used as adhesion promoters, the composition can be utilized with advantage to fill a joint between concrete blocks to produce a low modulus silicone elastomer joint with good adhesion to concrete and with sufficient modulus to accommodate the expansion and contractions of the concrete or masonry blocks between wide temperature extremes.

DESCRIPTION OF THE PREFERRED EMBODIMENT

The basic fluid of the compositions of the instant case is 100 parts by weight of a silanol end-stopped diorganopolysiloxane polymer having a viscosity varying from 100 to 100,000 centipoise at 25° C. where the organo groups is a monovalent hydrocarbon radical. The organo group can be selected from such radicals as alkyl radicals of 1 to 8 carbon atoms; mononuclear radicals such phenyl, methyl phenyl, ethyl phenyl, etc.; alkenyl radicals such as vinyl, allyl, etc., cycloalkyl radicals such as cyclohexyl, cycloheptyl, etc.; and haloalkyl radicals such as 3,3,3-trifluoropropyl. More preferably the diorganopolysiloxane polymer has the formula,

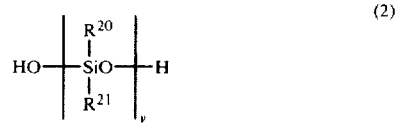

(2)

where $R^{20}$, $R^{21}$ are monovalent hydrocarbon radicals selected from the radicals specified above for the organo group and where v varies such that viscosity of the polymer varies from 100 to 100,000 centipoise at 25°. With 100 parts of such polymer there is utilized anywhere from 0.01 to 5 parts by weight of a cross-linker selected from the class consisting of ketoxime functional silanes and aminoxy functional silicone compounds and mixtures thereof. Preferably there is utilized anywhere from 0.1 to 0.5 parts by weight of cross-linker to 100 parts of a base silanol end-stopped diorganopolysiloxane polymer. It should be noted if too little cross-linker is utilized the composition will not cross-link sufficiently to have good tensile strength and if too much cross-linker is utlized the composition may have a short shelf life in the one component package or be too high in modulus. Preferably the cross-linker is a ketoxime functional silane, which has the formula,

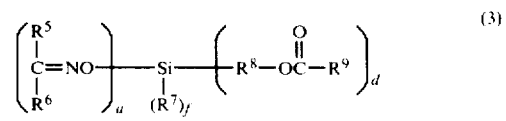

(3)

wherein $R^7$, $R^9$ are monovalent hydrocarbon radicals $R^5$, $R^6$ are the same or different and are selected from the class consisting of alkyl and haloalkyl radicals of 1 to 2 carbon atoms, $R^8$ is a divalent hydrocarbon radical of 2 to 8 carbon atoms, a is a number from 1 to 3, d is a number from 1 to 3, f is a number from 0 to 2 and the sum of a, d, and f is 4. The preferred ketoxime functional silane that can be utilized as the cross-linker of the present invention is one of the formula,

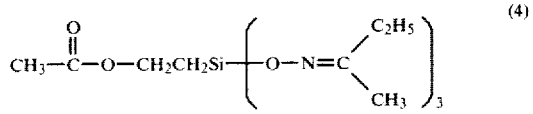

(4)

Suitable ketoxime functional silanes that can be utilized in the invention of the instant case can be found in the disclosure of U.S. Pat. No. 3,962,160 which is hereby incorporated into the present case by reference. The process for preparing such ketoxime functional silanes is also disclosed in the foregoing U.S. Pat. No. 3,962,160 which is incorporated by reference in the present case. Briefly such a process comprises taking an aliphatic olefinic containing carboxy compound and having it react with a hydrosilane such that the hydrogen adds on the aliphatic group by means of being catalyzed by a platinum catalyst. The addition product is then reacted with an organo functional ketoxime in the presence of a toulene base to produce the desired ketoxime functional silane. The ketoxime functional silane after it has been purified by the foregoing process disclosed in the foregoing Beers U.S. Pat. No. 3,962,160 can then be utilized as a crosslinking agent in the instant process. In place of a ketoxime or mixed with a ketoxime functional crosslinking agent, there may be utilized at the same concentrations as previously noted an aminoxy functional silane as disclosed in the foregoing Murphy U.S. patents. Examples of the aminoxy functional silanes which can be utilized as cross-linking agents in the compositions of the instant case are, for instance, to be found in U.S. Pat. No. 3,341,486; U.S. Pat. No. 3,341,486, U.S. Pat. No. 3,441,583, U.S. Pat. No. 3,528,941, U.S. Pat. No. 3,296,199. The preferred aminoxy functional cross-linking agents are to be found in detail more specifically in Murphy U.S. Pat. No. 3,441,583 which is hereby incorporated herein by reference. Per 100 parts of the silanol end-stopped base polymer that may be utilized anywhere from 0.01 to 0.5 parts by weight of cross-linker which is an aminoxy functional compound selected from compounds of the formula,

(5)

and of the formula,

(6)

where Y is a monovalent amine radical selected from $-N(R^{10})_2$ and a hetercyclic amine, $R^{10}$ is a monovalent hydrocarbon radical $R^9$ is a monovalent hydrocarbon radical, A is a member selected from the class consisting of hydrogen, halogen, alkoxy and $R^{10}SiO_{0.5}$, a is a whole number equal to 0, 1, 2 or 3, b is a whole number equal to 0 to 2, inclusive, c is an integer equal to 1 to 3, inclusive, and the sum of b and c is equal to 1 to 3 inclusive. The radicals $R^{10}$ and $R^9$ are monovalent hydrocarbon radials which can be any of the monovalent hydrocarbon radicals disclosed for the organo groups of the base silanol end-stopped polymer discussed previously. As pointed out previously, the cross-linking agent may be utilized in the preferred range of 0.1 to 0.5 parts by weight per 100 parts of the base silanol end-stopped polymer. In place of such aminoxy functional silanes as disclosed above there may be utilized aminoxy functional cyclic polysiloxanes as a cross-linking agent and the same concentration as indicated previously. Accordingly, the crosslinker can be selected from the class consisting of aminoxy organo functional polysiloxanes of from 3 to 8 chemically combined siloxy units and consisting of at least one aminoxysiloxy unit of the formula,

(7)

chemically combined with up to seven diorganosiloxy units of the formula,

(8)

and chainstopped with $R_3^{12}SiO_{0.5}$ units and aminoxyorganocyclopolysiloxanes having at least one unit of the formula,

(9)

chemically combined with from 1 to 18 units of the formula,

(10)

where $R^9$ and $R^{12}$ are monovalent hydrocarbon radicals and Y is a monovalent amine radical selected from $-NR_2^{10}$ and a heterocyclic amine and $R^{10}$ is a monovalent hydrocarbon radical.

Again the $R^9$ and $R^{10}$ and $R^{12}$ are monovalent hydrocarbon radicals which may be any of the monovalent hydrocarbon radicals disclosed prevously for the silanol end-stopped diorganopolysiloxane based polymer.

These cyclic aminoxy polysiloxanes disclosed above are the most preferred cross-linking agents for the systems in the instant case. Another aminoxy functional silane which is less preferred but can be utilized as crosslinker in the invention of the instant case at the concentration as disclosed for a previous aminoxy functional silane is a cross-linker which is selected from the class consisting of organosilicone compounds of the formula,

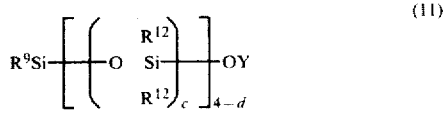

(11)

and aminoxy compound of the formula,

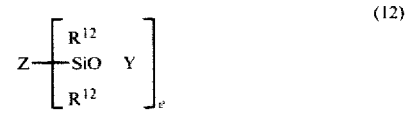

(12)

where $R^9$ and $R^{12}$ are monovalent hydrocarbon radicals, Y is a monovalent amine radical selected from the class of $-N(R^{10})_2$ and a heterocyclic amine where $R^{10}$ is a monovalent hydrocarbon radical, d is a whole number equal to 0 to 3, inclusive, e is an integer equal to 1 to 18, and Z is selected from oxygen, $R^{13}$ and

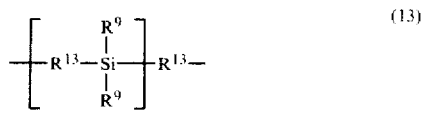

where $R^{13}$ is a divalent hydrocarbon radical.

The process for producing such aminoxy functional silanes is fully disclosed in the Murphy GE patents and more specifically in U.S. Pat. No. 3,296,199 which is incorporated into the present case by reference. As set forth in the patent and specifically columns 3 and 4 of the patent, the reactions that can be utilized to produce the diaminoxy organo silicone materials are between organo silicone materials having silicone hydride units and diethyl hydroxide amine units. Another method that can be employed involves the reaction in the presence of an acid accept or between halosilane in place of the silicone hydride and diethyl hydroxyl amine. The process for producing this preferred aminoxy functional silanes is set forth in U.S. Pat. No. 3,444,158 and not repeated here. The disclosure of this patent is incorporated into present case by reference. For a fuller disclosure as to the process that may be utilized to produce these compounds, one is referred to the foregoing Murphy, U.S. Pat. No. 3,441,583.

In addition other types of aminoxy functional silanes may be used as crosslinking agents in the composition of the instant case such as the alkoxy aminoxy cyclo polysiloxane cross-linking agents of U.S. Pat. No. 3,528,941.

The novel part of this composition is the use of such aminoxy or ketoxime functional silanes as cross-linking agents in combination with an amide coupler. Specifically, the amide coupler of Formula (1). In that Formula (1), R, $R^1$, $R^2$, $R^4$ are monovalent hydrocarbon radicals of 1 to 8 carbon atoms and are selected from alkyl radicals of 1 to 8 carbon atoms, mononuclear aryl radicals such as phenyl, methylphenyl, alkenyl radicals, such as vinyl, allyl, etc.; cycloalkyl radicals such as cyclo hexyl, cycloheptyl, and fluoroalkyl radicals such as 3,3,3-trifluoropropyl. Preferably the radicals do not contain more than 8 carbon atoms. The radical $R^3$ is divalent hydrocarbon radical of 2 to 8 carbon atoms and is more preferably an alkylene or arylene radical having anywhere from 2 to 8 carbon atoms. The amide coupler is preferaly utilized at a concentration of anywhere from 1 to 5 parts by weight of the coupler more preferably from 2 to 3.5 parts per 100 parts by weight of a base silanol end-stopped diorganopolysiloxane polymer. Preferably, R, $R^1$, $R^2$, $R^4$ are methyl radicals, while $R^3$ is an ethylene radical. Preferably the compound of formula has the formula,

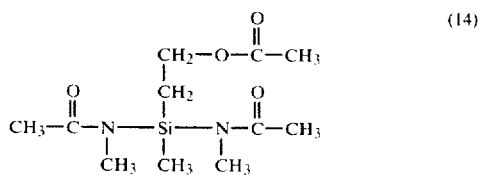

Notice that the coupler of the above formula has the proper reactivity in that most of the amide groups will immediately be hydroylyzed off by the silanol groups of the silanol end-stopped diorganopolysiloxane base polymer when the two are mixed so as to extend the chain length of such silanol end-stopped polymer. The acyloxy functional group will inpart the proper reactivity to the amide groups without itself hydrolyzing and thus cross-linking the composition. The amide functional silane disclosed above is a novel material which is subject of a co-pending docket of Beers and Mitchell U.S. Pat. No. 4,252,977 entitled "Novel Acetamide Compounds and Processes for Producing Them" filed at the same time as the present application. Accordingly, the first intermediate is produced by reacting the hydrogen di-chloro organo substituted silane with olefenic containing acyloxy compound in the presence of a platinum catalyst to form the corresponding dichlorosilane as evidenced by the following reaction.

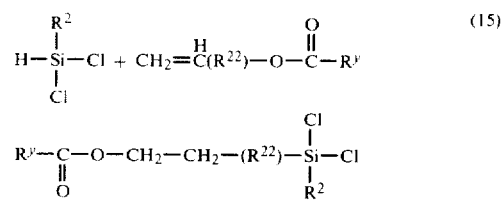

The corresponding dichlorosilane can then be taken and reacted with the desired amide to form the compound of Formula (1). In the foregoing formulas in the reaction shown above R and $R^1$ and $R^2$ and $R^4$ are as previously defined while $R^{22}$ is a divalent hydrocarbon radical of 1 to 6 carbon atoms. In the next reaction the dichlorosilane addition product of the SiH olefin addition reaction is reacted with the acetemide to produce the compound of Formula 1 in the presence of a solvent and tertiary amine such as triethylamine.

The above process is a general and novel process for producing the amide compound of Formula (1). Such compounds can also be produced by taking the dichlorosilane shown in the above reaction and reacting it with a sodium salt of the acetamide to produce a compound of Formula (1) with sodium chloride as a by-product. With respect to this reaction, it is to be found in U.S. Pat. No. 3,776,933. For details as to the process for producing the compound of Formula (1) and is referred to the co-pending application of Beers and Mitchell. It should be noted that the above preferred ranges of acetamide coupler of Formula 1 are from 1 to 5 parts per 100 parts of the base silanol end-stopped polymer and more preferably from 2 to 3.5 parts of the base silanol end-stopped polymer. If less than one part is utilized, sufficient coupling are not carried out. If more than 5 parts is utilized, then the product becomes of too low a modulus and does not have sufficient tensile strength in the cured state.

The ingredients of silanol end-stopped polymer, the coupler and the cross-linker as being one of the cross-linkers disclosed below, form the basic composition of the instant case. The components are mixed by simply adding the coupler to the base silanol material or adding together the cross-linker and coupler and mixing the ingredients in a substantially anhydrous manner. When it is desired to cure the composition, the package is broken and the composition applied. Upon being exposed to atmospheric moisture the composition cures to a low modulus silicone elastomer having an elongation preferably in the range of 1200 to 1600% and Tensile Strength of 45 to 100 p.s.i. The composition has a viscosity in the blended and uncured state about 200,000 centipoise at 25° C. To be utilized various other ingredients are added to the composition to improve or change its physical properties in the cured state. There may be utilized anywhere from 2 to 300 parts by weight of filler. There are reinforcing or semi-reinforcing fillers such as precipitated silica or high surface area calcium carbonates and preferably there is utilized anywhere from 2 to 60 parts of such types of fillers.

There are semi-reinforcing fillers which have a surface area that ranges from approximately 10 to 90 m$^2$/gram. An example of such a filler is calcium carbonate (treated or untreated) and certain silicas such as ground quartz, etc. When there is an extending filler then the amount of filler that can be utilized may be anywhere from 2 to 300 parts by weight per 100 parts of the base silanol end-stopped polymer. Examples of the extending fillers that can be utilized are for instance in Smith Jr. et al., Ser. No. 16,254, now U.S. Pat. No. 4,273,698 for instance titanium dioxide, lithopone, zinc oxide, zirconium silicate, silica aerogel, iron oxide, diatomaceous earth, glass fibers magnesium oxide, chormic oxide, zirconium oxide, alpha quartz, calcined clay, asbestos, carbon, graphite, cork, cotton, and synthetic fibers. If a fumed silica or precipitated silica on calcium carbonate filler is utilized then such fillers are treated with a silicone compound such as an organo silicone and silazane treated silica as described in Lucas, U.S. Pat. No. 2,938,009, Lichtenwalner, U.S. Pat. No. 3,004,859 and Smith, U.S. Pat. No. 3,635,743, which are incorporated into the present case by reference.

There can be utilized in the instant composition a catalyst. The catalyst is not necessary since the composition cures with sufficient rapidity in the presence of one of the cross-linkers mentioned previously without the use of a catalyst. However, if desired, there can be added to 100 parts of the base silanol end-stopped polymer from 0.001 to 2 parts by weight of a tin soap of carboxylic acid such as dibutyl dilaurate. The instant composition also does not need a plasticizer; however, if desired a plasticizer may be added. Accordingly, per 100 parts of the base silanol end-stopped polymer there may be incorporated into the composition from 1 to 50 parts by weight of a triorganosilyl end-stopped diorganopolysiloxane having a viscosity varying from 10 to 10,000 centipoise at 25° C. where the organic groups are monovalent hydrocarbon radicals. The organo groups can be any monovalent hydrocarbon radical but more preferably alkyl radicals of 1 to 8 carbons such as methyl. The organo groups may also be selected from monovalent hydrocarbon radicals such as alkenyl radicals, such as vinyl, mononuclear radicals such as phenyl, cycloalkyl such as cyclo hexyl, and haloalkyl radicals such as 3,3,3-trifluoropropyl. Triorganosilyl end-stopped polysiloxane polymers can be produced either by the hydrolysis of the appropriate chlorosilanes or more preferably by the equilibration of the appropriate cyclotetrasiloxanes with triorganosilyl chain-stoppers. As stated previously a plasticizer is not needed in the instant invention but may be utilized.

The instant composition also has good adhesion properties; however, the adhesive properties may be improved by the addition of certain additives. Another preferred embodiment of the present composition there can also optionally be used an adhesion promoter e.g. from 0.2 to 2 parts by weight of such a promoter per 100 parts of a base silanol end-stopped polymer. These can generally be a nitrogen containing compound of the formula,

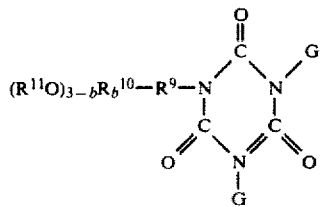

wherein G is a (R$^{31}$O)$_{3-b}$-R$_b^3$O—Si—R$^{39}$ radical, styryl, vinyl, allyl, chloroallyl or cyclohexenyl radical or a R$^{30}$ radical, as hereinafter defined; R$^{39}$ is a divalent radical selected from alkylenearylene, alkylene, cycloxyene and halosubstituted such divalent radicals; R$^{30}$ is a radical of up to 8 carbon atoms selected from hydrocarbyl or halohydrocarbyl and R$^{31}$ is a radical of the type defined for R$^{30}$ and also cyano lower alkyl; and b is 0 to 3 R$^9$, R$^{10}$, and R$^{11}$ are as previously defined.

Such adhesion promoters are disclosed in Berger, U.S. Pat. No. 3,517,001, which is incorporated herein by reference. The preferred such promoters are 1,3,5-tris-trimethoxysilylpropylisocyanurate and bis-1,3-trimethoxysilypropylisocyanurate, the former being most preferred.

Although any conventional adhesion promotion can be used, special mention is also made of an adhesion promoter known as glycidoxypropyltrimethoxysilane.

Additional conventional ingredients can also be included, such as flame retardants, stabilizing agents, pigments, and the like.

In place of the cyanurate adhesion promoters that may be utilized anywhere from 0.1 to 3 parts by weight per 100 parts of the base silanol end-stopped polymer of a self-bonding additives selected from the groups consisting of

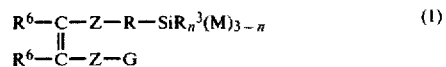 (1)

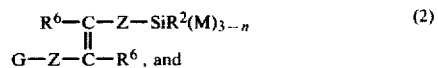 (2)

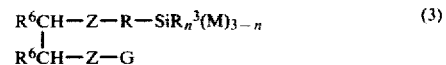 (3)

where Z is selected from

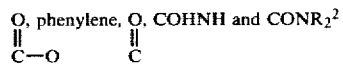

G is selected G is selected from the class consisting of hydrogen, R$^1$, R$^4$ SI R$_n^2$(M)$_{3-n}$ where R$^1$ is selected from monovalent hydrocarbon radicals and halogenated monovalent hydrocarbon radicals, R and R$^4$ is a divalent hydrocarbon radical, R$^2$ is selected from monovalent hydrocarbon radicals and halogenated monovalent hydrocarbon radicals, M is selected from R$^3$O and R$^3$

radicals $R^3$ is selected from monovalent hydrocarbon radicals and halogenated monovalent hydrocarbon radicals, $R^6$ is selected from hydrogen, and alkyl radicals of up to 10 carbon atoms and n is a whole number that varies from 1 to 3, and self-bonding polysiloxane additives selected from the group consisting of the formulas, $$\left( \begin{array}{c} R^6-C-Z-Z-R- \\ \| \\ R^6-C-Z-G^1 \end{array} \right)_a R_b{}^2 SiO_{\frac{4-a-b'}{2}} \quad (4)$$

$$\left( \begin{array}{c} R^6-C-Z-R- \\ \| \\ G^1-Z-C-R^6 \end{array} \right)_a R_b{}^2 SiO_{\frac{4-a-b'}{2}}$$

$$\left( \begin{array}{c} R^6-CH-Z-R- \\ | \\ R^6-CH-Z-G' \end{array} \right)_a R_b{}^2 SiO_{\frac{4-a-b'}{2}} \quad (6)$$

where $G'$ is selected from the class consisting of hydrogen, R and $R^4H_cR_d{}^2 SiO_{(3-c-d/2)}$ and where Z, $R^1$, $R^4$, $R^2$ and R are as previously defined, a varies from 0.005 to 2.0, b' varies from 1.0 to 2.5, the sum of a+b varies from 1.005 to 3.0, c varies from 0 to 1.0, d varies from 1.0 to 2.5 and the sum of c+d varies from 1.0 to 2.0.

The foregoing self-bonding additives of maleates, fumarates and succinates are disclosed in the patent application of M. D. Beers, et al., Ser. No. 16,255 filed Feb. 28, 1979, now U.S. Pat. No. 4,247,445 which disclosures are hereby incorporated into the present case by reference. The foregoing process for producing such adhesion promotors are well as the use of the adhesion promotors are disclosed in the patent application referred to above which are incorporated by reference in the present case.

The foregoing composition with or without the adhesion promotors as disclosed below will have good adhesion to various masonary substrates including concrete.

The composition is prepared by mixing the silanol end-stopped polymer with a filler and preparing a suitable mixture, then the coupler is added to the composition after silanol end-stopped polymer mixture has been substantially made anhydrous. The coupler is added in a substantially anhydrous state. This is done by heating the base so as to remove excess moisture under vacuum and then adding the coupler in that state to the silanol end-stopped polymer which has been dehydrated. It should be noted that the coupler is kept in the anhydrous state after it has been made otherwise it will be hydrolyzed. Then the cross-linker with or without the coupler is added to the mixture. There may be prepared a mixture of other ingredients in the cross-linking agent and this may be aded to the base composition after the coupler has been mixed with the silanol end-stopped polymer. The composition is then packaged in a substantially anhydrous state in a single component. When it is desired to cure the composition, the package is broken and the composition is exposed to atmospheric moisture to cure to a silicone elastomer. When exposed to atmospheric moisture, the composition will form a skin and in about from anywhere from 0.5 to 8 hours and cure fully to a silicone elastomer in 24 to 72 hours in thickness up to about 0.25 m. The composition which is produced has good adhesion to various substrates as pointed out previously and is admirably suited to be utilized as a sealant for weather proofing purposes and specifically as a joint sealant between concrete highway road beds, sealing the blocks together to prevent moisture from entering the crevices in between the concrete blocks and also to take up the contraction and expansion of the road beds without rupturing the seal. As can be visualized such a composition has wide spread use also in construction, sealing in the fabrication of buildings.

Examples below are given for the purpose of illustrating the present invention. They are not given for any purpose of setting limits and boundaries to the instant invention. All the examples are by weight.

EXAMPLE 1

Prepared a base compound comprising 100 parts by weight of a 25,000 centipoise, viscosity at 25° of a silanol terminated polydimethyl siloxy polymer. To this, there was added 5 parts by weight of 20 centipoise viscosity of 25° C. at a trimethylsilane terminated dimethylsiloxy co-polymer containing approximately 20 mole percent diphenyl siloxy units. To this composition, their was mixed into this base composition 9 parts by weight of a octamethyl tetrasiloxane treated fume silica having the surface area of approximately 200 meters square per gram and 90 parts by weight of stearic acid treated calcium carbonate. There was then prepared a catalyst mixture, comprising 3 parts by weight of acetoxyethyl-bis-N-methylacetamido methyl silane and one part by weight of acetoxyethyl-tris (methylethylketoximo) silane. The foregoing four parts weighted to 100 parts of the base mixture and the composition mixed in the absence of air and atmospheric moisture and then was packaged in 6 ounce polyethylene Semco tubes. Test sheets were then prepared and allowed to cure for ten days at 77° F. and 50% relative humidity. The following test results were achieved.

| Shore A, hardness | 10 |
|---|---|
| Tensile, psi | 83 |
| Elongation, % | 1325 |
| Tack free time, hrs. | 4.5 |

EXAMPLE 2

There was prepared a base mixture comprising 100 parts by weight of 3,000 centipoise viscosity at 25° C., silanol end-stopped polysiloxane polymer, polydimethylsiloxane polymer to which was added 5 parts by weight of 20 centipoise viscosity at 25° C. of a trimethylsiloxy end-stopped dimethyl siloxy diphenyl siloxy copolymer containing approximately 20 mol percent diphenyl siloxy units. To this there was added a mixture of 9 parts by weight of octamethylcyclotetrasiloxane treated fumed silica having a surface of approximately 200 meters per gram. To this there was added 160 parts by weight of stearic acid treated calcium carbonate, 5.5 parts of titanium dioxide pigment and 0.14 parts by weight of carbon black. To 100 parts of the base polymer mixture which was packaged in the anhydrous state there was added 2.5 parts by weight of acetoxyethyl-bis (N-methylacetamido) methyl silane and 1.0 parts of acetoxyethyl-tris (methylethylketoximo) silane. The resulting composition was prepared and mixed in the same manner as Example 1 above and the result obtained from the cured composition were:

| Shore A, hardness | 23 |
|---|---|
| Tensile, psi | 88 |
| Elongation, % | 825 |

EXAMPLE 3

There was prepared a base compound formulation hereinafter referred to as composition M having:

|  | Parts |
|---|---|
| Silanol terminated polymethylsiloxane (25,000 cps.) at 25° C. | 100.00 |
| Thixotrope - a polyoxyethylene glycol ether (Ucon-1145)* | 0.2 |
| Octamethyltetracyclosiloxane treated fumed silica (surface area 200 M²/gram) | 8 |
| Stearic acid treated calcium carbonate | 90 |
| To 100 parts by weight of Composition M there was added: | |
| Acetoxyethyl methyl bis-(N-methyl acetamido) silane | 3.0 |
| Butyltetramethyl tris-(diethylaminoxy) cyclotetrasiloxane | 0.6 |
| Physical Properties | |
| Cure conditions: | 10 days room temperature (25° C.) and 50 ± 5% R.H. |
| Shore A | = 18 |
| Tensile, psi | = 145 |
| Elongation, % | = 820 |

*Union Carbide Trademark

-continued

| Work Life, hrs. | 0.5 |
|---|---|
| Tack free time, hrs. | 4.5 |

What is claimed is:

1. A room temperature vulcanizable silicone rubber composition with very low modulus comprising
   (A) 100 parts by weight of silanol endstopped diorganopolysiloxane having a viscosity varying from 100 to 100,000 centipoise at 25° C. when the organo is a monovalent hydrocarbon radical;
   (B) from 1 to 5 parts by weight of a coupler having the formula

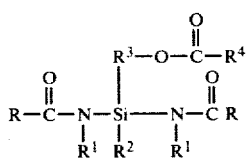

where R, $R^1$, $R^2$, $R^4$ are monovalent hydrocarbon radicals of 1 to 8 carbon atoms, $R^3$ is a divalent hydrocarbon radical of 2 to 8 carbon atoms; and
   (C) from 0.01 to 5.0 parts by weight of cross-linking agent selected from the class consisting of ketoxime functional silanes and aminoxy functional silane compounds and mixtures thereof.

2. The composition of claim 1 wherein there is further present from 2 to 300 parts by weight of filler.

3. The composition of claim 2 wherein if the filler is a reinforcing or semi-reinforcing filler selected from the class consisting of fumed silica, precipitated silica and high surface area calcium carbonates mixtures thereof there is present from 2 to 60 parts of such filler.

4. The composition of claim 2 where the filler is an extending filler.

5. The composition of claim 1 wherein there is further present from 0.001 to 2 parts by weight of a tin salt of a carboxylic acid.

6. The composition of claim 1 wherein R, $R^1$ and, $R^4$ are selected from the class consisting of alkyl radicals of 1 to 8 carbon atoms and aryl radicals and mixtures thereof, $R^2$ is selected from the class consisting of alkyl radicals, vinyl radicals and aryl radicals of up to 8 carbon atoms and $R^3$ is selected from the class consisting of alkylene and arylene radicals of 2 to 8 carbon atoms.

7. The composition of claim 6 wherein in (B) said coupler has the formula,

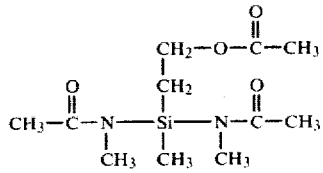

8. The composition of claim 1 wherein there is further present from 1 to 50 parts by weight of a triorgano silyl-end stopped diorganpolysiloxane having a viscosity of 10 to 10,000 centipoise at 25° C. where the organo groups are monovalent hydrocarbon radicals.

9. The composition of claim 1 wherein the cross-linker has in (C) has the formula,

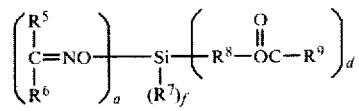

wherein $R^7$ and, $R^9$ are monovalent hydrocarbon radicals, $R^5$ and, $R^6$ are the same or different and are selected from the class consisting of alkyl and haloalkyl of 1 to 2 carbon atoms, $R^8$ is a divalent hydrocarbon radical of 2 to 8 carbon atoms, a is a number from 1 to 3, d is a number from 1 to 3, f is a number from 0 to 2 and the sum of a, d, and + is 4.

10. The composition of claim 9 wherein the Ketoxime cross-linker has the formula,

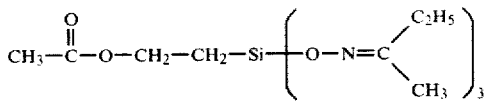

11. The composition of claim 1 wherein (C) the cross-linker is an aminoxyfunctional compound selected from compounds of the formula,

and of the formula,

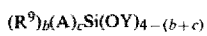

where Y is a monovalent amine radical selected from $-N(R^{10})_2$ and hetercyclic amine, $R^{10}$ is a monovalent hydrocarbon radical, $R^9$ is monovalent hydrocarbon radical, A is a member selected from the class consisting of hydrogen, halogen, and alkoxy and $R^{10}SiO_{0.5}$, a is a whole number equal to 1, 2 or 3, b is a whole number equal to 0 to 2, inclusive, c is an integer equal to 1 to 3, inclusive, and the sum of b and c is equal to 1 to 3 inclusive.

12. The composition of claim 1 wherein in (C) the cross-linker is selected from the class consisting of an aminoxy organopolysiloxane compound of from 3 to 8 chemically combined siloxy units and consisting of at least one aminoxysiloxy unit of the formula,

chemically combined with up to seven diorganosiloxy units of the formula,

and chainstopped with $R_3^{12} SiO_{0.5}$ units and an aminoxyorganocyclopolysiloxane having at least one unit of the formula,

chemically combined with from 1 to 18 units of units of the formula,

and where $R^9$ and $R^{12}$ are monovalent hydrocarbon radicals and Y is a monovalent amine radical selected from $-NR_2^{10}$ and a hetrocyclic amine and $R^{10}$ is a monovalent hydrocarbon radical.

13. The composition of claim 1 wherein in (C) the cross-linker is selected from the class consisting of an aminoxy-organosilicon compound of the formula,

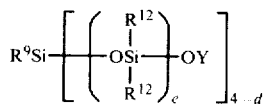

and aminoxy compound of the formula,

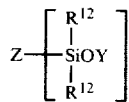

where $R^9$ and $R^{12}$ are monovalent hydrocarbon radicals, Y is monovalent amine radical selected from the class of $-N(R^{10})_2$ and a heterocyclic amine where $R^{10}$ is a monovalent hydrocarbon radical, d is a whole number equal to 0 to 3, inclusive, e is an integer equal to 1 to 18, inclusive, and Z is selected from oxygen, $R^{13}$ and

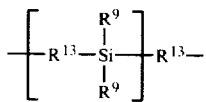

where $R^{13}$ is a divalent hydrocarbon radical.

14. The composition of claim 1 wherein diorganopolysiloxane polymer (A) has the formula,

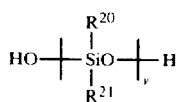

where $R^{20}$, $R^{21}$ are monovalent hydrocarbon radicals and v varies such that the viscosity of the polymer varies from 100 to 100,000 centipose at 25° C.

15. A process for forming a room temperature vulcanizable silicone rubber composition with very low modulus comprising (1) mixing
(A) 100 parts by weight of silanol end-stopped diorganopolysiloxane having a viscosity varying from 100 to 100,000 centipoise at 25 C when the organo is a monovalent hydrocarbon radical;
(B) from 1 to 5 parts by weight of a complex having the formula

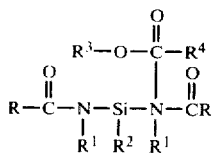

where R, $R^1$, $R^2$, $R^4$ are monovalent hydrocarbon radicals of 1 to 8 carbon atoms, $R^3$ is a divalent hydrocarbon radical of 2 to 8 carbon atoms; and
(C) from 0.1 to 5.0 parts by weight of cross-linker selected from the class consisting of ketoxime functional silane and aminoxy functional silane compounds and mixtures thereof;
and (2) allowing the mixture to cure at room temperature.

16. The process of claim 15 wherein there is present from 2 to 300 parts by weight of filler.

17. The process of claim 16 wherein if the filler is a reinforcing or semi-reinforcing filler selected from the class consisting of fumed silica, precipitated silica and calcium carbonate and mixtures thereof there is present from 2 to 60 parts of treated filler.

18. The process of claim 16 wherein the filler is an extending filler.

19. The process of claim 15 where there is further present from 0.001 to 2 parts by weight of a tin soap of a carboxylic acid.

20. The process of claim 15 wherein $R^4$ is selected from the class consisting of alkyl radicals of 1 to 8 carbon atoms and aryl radicals and mixtures thereof and $R^2$ is selected from the class consisting of alkyl radicals, vinyl radicals, aryl radicals of up to 8 carbon atoms and $R^3$ is selected from the class consisting of alkylene and arylene radicals of 2 to 8 carbon atoms.

21. The process of claim 20 wherein (B) said coupler has the formula,

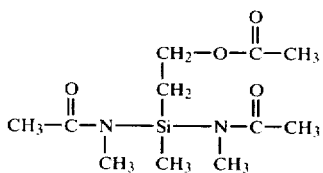

22. The process of claim 15 where there is further present from 1 to 50 parts by weight of a triorganosilanol end-stopped diorganopolysiloxane having a viscosity varying from 10 to 10,000 centipoise at 25° C. where the organo groups are monovalent hydrocarbon radicals.

23. The process of claim 1 wherein the cross-linker (C) has the formula,

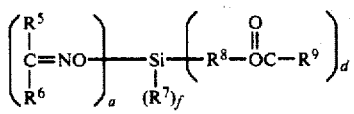

wherein R⁷ and, R⁹ are monovalent hydrocarbon radicals, R⁵ and, R⁶ are the same or different and are selected from the class consisting of alkyl and haloalkyl radicals of 1 to 2 carbon atoms, R⁸ is divalent hydrocarbon radicals of 2 to 8 carbons, a is the number from 1 to 3, d is the number from 1 to 3, f is a number from 0 to 2 and the sum of a, d, and f is 4.

24. The process of claim 23 wherein the Ketoxime cross-linker has the formula,

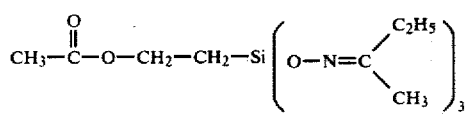

25. The process of claim 15 wherein (C) the cross-linker is an aminoxy functional compound selected from compounds of the formula,

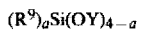

$(R^9)_a Si(OY)_{4-a}$ and of the formula,

$(R^9)_b(A)_c Si(OY)_{4-(b+c)}$ where Y is a monovalent amine radical selected from —N(R¹⁰)₂ and heterocyclic amine, R¹⁰ is a monovalent hydrocarbon radical, R⁹ is monovalent hydrocarbon radical, A is a member selected from the class consisting of hydrogen, halogen, and alkoxy and R¹⁰SiO₀.₅, a is a whole number equal to 0, 1, 2 or 3, b is a whole number equal to 0 to 2, inclusive, c is an integer equal to 1 to 3, inclusive, and the sum of b and c is equal to 1 to 3 inclusive.

26. The process of claim 15 wherein (C) the cross-linker is selected from the class consisting of an aminoxy organopolysiloxane compound of from 3 to 8 chemically combined siloxy units and consisting of at least one aminoxysiloxy unit of the formula,

chemically combined with up to seven diorganosiloxy units of the formula,

$(R^{12})_2 SiO$ and aminoxyorganocyclopolysiloxanes having at least one unit of the formula and chainstopped with R¹²₃SiO₀.₅ units,

chemically combined with from 1 to 18 units of units of the formula, $(R^{12})_2 SiO$ where R⁹ and R¹² are monovalent hydrocarbon radicals and Y is a monovalent amine radical selected from —NR₂¹⁰ and a hetrocyclic amine and R¹⁰ is a monovalent hydrocarbon radical.

27. The process of claim 15 wherein (C) the cross-linker is selected from the class consisting of an aminoxy-organosilicon compound of the formula,

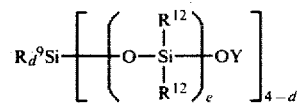

and aminoxy compound of the formula,

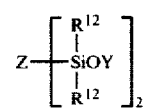

where R⁹ and R¹² are monovalent hydrocarbon radicals, Y is a monovalent amine radical selected from the class of —N(R¹⁰)₂ and a heterocyclic amine where R¹⁰ is a monovalent hydrocarbon radical, d is a whole number equal to 0 to 3, inclusive, e is an integer equal to 1 to 18, inclusive, and Z is selected from oxygen, R¹³ and

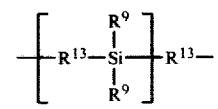

where R¹³ is a divalent hydrocarbon radical.

28. The process of claim 15 wherein the diorganopolysiloxane polymer (A) has the formula,

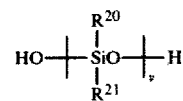

where R²⁰, R²¹ are monovalent hydrocarbon radicals and v varies such that the viscosity of the polymer varies from 10 to 100,000 centipoise at 25° C.

29. A process for filling a joint of two or more masonary structures with a low modulus room temperature vulcanizable silicone rubber composition comprising (1) filling the empty joint space between the masonary structures with a silicone composition having (A) 100 parts by weight of silanol end-stopped diorganopolysiloxane having a viscosity varying from 100 to 100,000 centipoise at 25° C. when the organo is a monovalent hydrocarbon radical;

(B) from 1 to 5 parts by weight of a coupler having the formula,

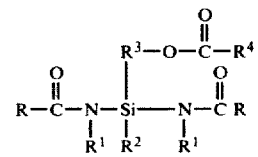

where R, $R^1$, $R^2$, $R^4$ are monovalent hydrocarbon radicals of 1 to 8 carbon atoms, $R^3$ is a divalent hydrocarbon radical of 2 to 8 carbon atoms; and (C) from 0.1 to 5.0 parts by weight of cross-linker selected from the class consisting of ketoxime functional silanes and aminoxy functional silane compounds and mixtures thereof, and (2) Allowing the silicone composition to cure at room temperature to form a low modulus silicone elastomer.

30. The process of claim 29 where there is further present from 2 to 300 parts by weight of filler.

31. The process of claim 29 wherein if the filler is a reinforcing or semi-reinforcing filler selected from a class consisting of fumed silica, percipitate silica and calcium carbonate, and mixtures thereof there is present from 2 to 60 parts of said filler.

32. The process of claim 30 wherein the filler is an extending filler.

33. The process of claim 29 where there is further present from 0.001 to 2 parts by weight of tin soap of a carboxylic acid.

34. The process of claim 29 where R, $R^1$ and $R^4$ are selected from the class consisting of alkyl radicals of 1 to 8 carbon atoms and aryl radicals and mixtures thereof, $R^2$ is selected from the class consisting of alkyl radicals, vinyl radicals and aryl radicals of up to 8 carbon atoms and $R^3$ is selected from the class consisting of alkylene and arylene radicals of 2 to 8 carbon atoms.

35. The process of claim 34 wherein (B) said coupler has the formula,

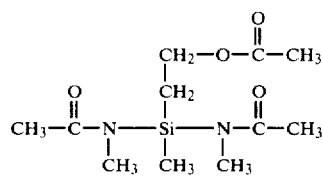

36. The process of claim 29 where there is further present from 1 to 50 parts by weight of a triorganosilyl end-stopped diorganopolysiloxane having a viscosity of 10 to 10,000 centipoise at 25° C. where the organo groups are monovalent hydrocarbon radicals.

37. The process of claim 29 wherein the cross-linker (C) has the formula,

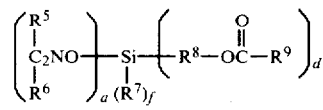

wherein $R^7$ and, $R^9$ are monovalent hydrocarbon radicals, $R^5$ and, $R^6$ are the same or different and are selected from the class consisting of alkyl and haloalkyl of 1 to 2 carbon atoms, $R^8$ is a monovalent hydrocarbon radical of 2 to 8 carbon atoms, a is a number from 1 to 3, d is a number from 1 to 3, f is a number from 0 to 2 and the sum of a, d, and f is 4.

38. The process of claim 37 wherein the ketoxime

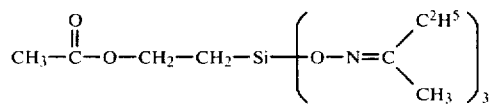

39. The process of claim 29 wherein (C) the cross-linker is an aminoxy functional compound selected from the compounds of the formula,

and of the formula,

where Y is a monovalent amine radical selected from $-N(R^{10})_2$ and heterocyclic amine, $R^{10}$ is a monovalent hydrocarbon radical $R^9$ is a monovalent hydrocarbon radical, A is a member selected from the class consisting of hydrogen, halogen, and alkoxy and $R^{10}SiO_{0.5'}$, a is a whole number equal to 0, 1, 2 or 3, b is a whole number equal to 0 to 2, inclusive, c is an integer equal to 1 to 3, inclusive, and the sum of b and c is equal to 1 to 3 inclusive.

40. The process of claim 29 wherein (C) the cross-linker is selected from the class consisting of an aminoxy organopolysiloxane compound of from 3 to 8 chemically combined siloxy units and consisting of at least one aminoxysiloxy unit of the formula,

chemically combined with up to seven diorganosiloxy units of the formula,

and aminoxyorganocyclopolysiloxanes having at least one unit of the formula and chainstopped with $R^{12}{}_3SiO_{0.5}$ units,

chemically combined with from 1 to 18 units of units of the formula,

where $R^9$ and $R^{12}$ are monovalent hydrocarbon radicals and Y is a monovalent amine radical selected from $-NR_2{}^{10}$ and a hetrocyclic amine and $R^{10}$ is a monovalent hydrocarbon radical.

41. The process of claim 29, wherein (C) the cross-linker is selected from the class consisting of an aminoxy-organosilicon compound of the formula,

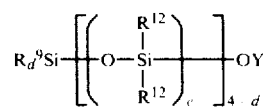

and aminoxy compound of the formula,

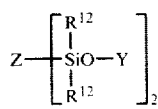

where $R^9$ and $R^{12}$ are monovalent hydrocarbon radicals, Y is a monovalent amine radical selected from the class of $-N(R^{10})_2$ and a heterocyclic amine where $R^{10}$ is a monovalent hydrocarbon radical, d is a whole number equal to 0 to e, inclusive, 3 is an integer equal to 1 to 18, inclusive and Z is selected from oxygen, $R^{13}$ and

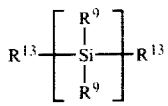

where $R^{13}$ is a divalent hydrocarbon radical.

42. The process of claim 29 wherein the diorganopolysiloxane polymer (a) has the formula,

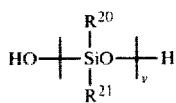

where $R^{20}$, $R^{21}$ are monovalent hydrocarbon radicals and v varies such that the viscosity of the polymer varies from 100 to 100,000 centipoise at 25° C.

43. A concrete structure joint which is filled with a low modulus room temperature vulcanizable silicone rubber composition comprising two masonary surfaces which are part of masonary structures joining each other to form a space between the masonary surfaces wherein the space between the masonary surface is filled with a low modulus room temperature vulcanizable silicone rubber composition having (A) 100 parts by weight of silanol end-stopped diorganopolysiloxane having a viscosity varying from 100 to 100,000 centipoise at 25 C when the organo is a monovalent hydrocarbon radical;

(B) from 1 to 5 parts by weight of a complex having the formula $$\begin{array}{c} \text{O} \\ \| \\ R^3-O-C-R^4 \\ | \\ \text{O} \qquad \qquad \text{O} \\ \| \qquad \qquad \| \\ R-C-N-Si-N-C\,R \\ | \quad | \quad | \\ R^1 \quad R^2 \quad R^1 \end{array}$$

where R, $R^1$, $R^2$, $R^4$ are monovalent hydrocarbon radicals of 1 to 8 carbon atoms, $R^3$ is a divalent hydrocarbon radical of 2 to 8 carbon atoms; and (C) from 0.1 to 5.0 parts by weight of cross-linker selected from the class consisting of Ketoxime functional silanes and aminoxy functional silane compounds and mixtures thereof.

* * * * *